Patented Sept. 11, 1928.

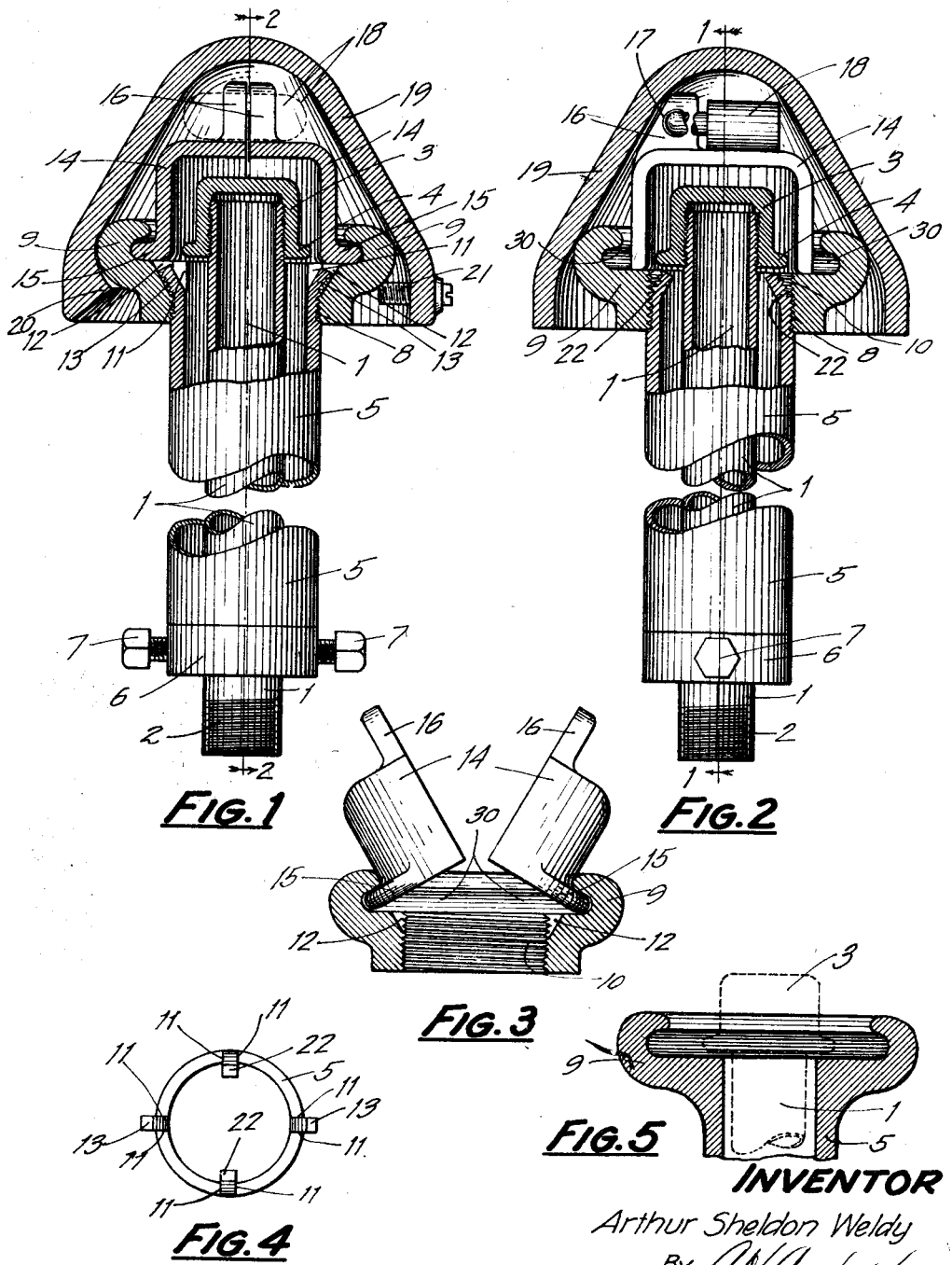

1,683,746

UNITED STATES PATENT OFFICE.

ARTHUR SHELDON WELDY, OF CANTON, OHIO.

PIPE SEAL.

Application filed September 3, 1926. Serial No. 133,454.

The objects of my invention are to provide a seal of this character which may be locked in place, which cannot be readily broken open, and which will be so designed as to prevent the supply pipe from being unscrewed from the tank or at any connection point.

I am, of course, aware that it has been proposed to provide locking or sealing devices of various character on strainer tubes or the like, but all of these, are so designed that either the locking device itself, or the device including the filler pipe, may be readily removed with a suitable wrench without unlocking or breaking the seal. It is therefore the primary object of my invention to provide a device of simple character which may be freely turned with a wrench, or by hand, but which will prevent access to the tank unless unlocked.

With these objects in view my invention, in its preferred form, includes the novel elements and combinations of elements described below and illustrated in the accompanying drawing in which Figs. 1 and 2 are vertical axial sections of my device taken at right angles to each other.

Fig. 1 is a section of Fig. 2 on the line 1—1;
Fig. 2 is a section of Fig. 1 on the line 2—2;
Fig. 3 is a detail of a novel flange, and the divided covers which may be locked over the supply pipe;
Fig. 4 is a top view of a novel element of my device; and
Fig. 5 is a fragmentary view of a modified form of my invention.

Referring to the drawings, 1 represents the filling pipe which is ordinarily threaded at its lower end as shown at, 2, and adapted to be screwed into a tank or reservoir, usually located under the ground. The top of pipe, 1, is closed by the screw cap, 3, having a bottom flange, 4, preferably extending entirely around the cap. Surrounding the pipe, 1, is the outer pipe, 5, which fits loosely about pipe, 1, and is prevented from dropping down toward the tank by means of the collar, 6, secured to the pipe, 1, by set screws, 7. It is to be understood that the pipe, 5, extends down into the ground some distance and that the collar, 6, is not easily accessible. The pipe, 5, may even extend to and rest upon the tank, or it may be supported by the earth. In any event the pipe, 5, extends a substantial distance into the ground so that access cannot be had to pipe 1. The top of the pipe, 5, is preferably threaded, as shown at 8, to receive the open flange, 9, which is internally threaded, as at 10, and which is provided with a circumferential recess, 30, about its inner periphery. The top of pipe, 5, at the quadrant points, is cut longitudinally for a short distance, as shown at 11, (see Figs. 1 and 4), to provide tongues, 13 and 22. The flange or cap, 9, at diametrically opposed points, is also provided with small inclined notches, 12, as shown in Figs. 1 and 3, the width of the notch being a trifle larger than the distance between adjacent cuts in pipe, 5. The flange, 9, is screwed down on pipe, 5, and locked in place by driving the tongues, 13, of pipe, 5, into the notches, 12.

The screw cap, 3, is concealed and protected by the divided covers, 14, provided on their bottom edges with flange, 15, extending only partially around the covers, 14, and adapted to fit within the circumferential recess in flange, 9. Each cover at the top is provided with a lug, 16, and these lugs are adjacent when the covers are in the closed position, as shown in Fig. 1. Each of these lugs is provided with an opening, 17, adapted to align when the covers are in the closed position, and through which a padlock, 18, may be snapped.

As a protection for the lock, the covering, 19, is provided, which has an enlarged portion, 20, for a small distance about its bottom inner periphery, as shown in Fig. 1, and is provided, at a point diametrically opposite this enlarged portion, with the set screw, 21, to lock it in place, as shown in Fig. 1.

To prevent pipe, 5, with its attached parts from being lifted out of the ground and over pipe, 1, the tongues, 22, of pipe, 5, are struck inwardly, as shown in Figs. 2 and 4 so that they will, if any attempt is made to lift pipe, 5, strike against the flange, 4, on cap, 3, and thus prevent access to the cap, 3, in this manner.

From a consideration of the foregoing, it will be apparent that cover, 19, may be readily removed by loosening the set screw, 21, and that by unlocking the padlock, 18, the divided covers, 14, may be removed and access thus had to cap, 3. However, it will be extremely difficult to separate the flange, 9, from pipe, 5. The flange, 9, is securely locked to pipe, 5, and any attempt to turn either the pipe or the flange will simply move the pipe, 5, about the pipe, 1. Any attempt to withdraw pipe, 5, from the ground will be frustrated by the tongues or projections, 22, of pipe, 5, striking against the bottom of cap, 4. It will thus be apparent that I have provided in a very simple way for preventing anyone from tampering with the feed pipe, 2.

It is obvious that many changes may be made in the details of construction herein described and illustrated in their preferred form. For example, the outer pipe and its flange might be made integral, as shown in Fig. 5, and with such an internal diameter or clearance, at any point, that it could not be drawn over cap, 3. This and other modifications, which might be made without departing from my invention in its broad aspects, will be apparent to those skilled in the art.

It is therefore to be understood that while I have described my invention somewhat in detail for the purpose of clearness, the words which I have used are words of description rather than words of limitation, and changes within the purview of the appended claims may be made without departing from the true scope and spirit of my invention.

What I claim is—

1. A device of the character described comprising a flanged pipe, a second pipe within and independent of said flanged pipe, a sealing cap on said inner pipe, a covering means coacting with said flanged pipe for preventing access to said cap, and means for locking said covering means in engagement with the flanged pipe.

2. As an article of manufacture adapted to be placed over the filling pipe of a gasoline tank or the like which is normally sealed by a cap thereon, a flanged pipe adapted to surround said filling pipe, means on said flanged pipe adapted to coact with the cap on said filling pipe to prevent the withdrawal of the flanged pipe from about the filling pipe, and removable means in normally locked engagement with said flanged pipe for preventing access to the filler pipe.

3. In a device for preventing access to the end sealing means on a filler pipe of an inaccessible tank, a pipe loosely surrounding said filler pipe and provided with means adapted to engage the sealing means to positively prevent longitudinal separation of said pipes when the sealing means is in place.

4. In a device of the character described, the combination with a filler pipe for a tank or the like, of means loosely surrounding said filler pipe, including removable means preventing access to the end of said filler pipe, and means for positively preventing the longitudinal separation of said filler pipe and said first mentioned means.

5. A device for preventing access to the sealing cap of a filler pipe for a gasoline tank or the like comprising a pipe having an internal diameter slightly larger than the external diameter of the filler pipe but with insufficient internal clearance to pass over the cap thereon and adapted to loosely surround said filler pipe, and removable means in normally locked engagement with said surrounding pipe for preventing access to the filler pipe.

6. A device for preventing access to the sealing cap of a filler pipe for a gasoline tank or the like comprising a second pipe loosely surrounding said filler pipe, and a removable covering means in normally locked engagement with said second pipe for concealing and protecting said cap; the second pipe and filler cap being adapted to coact to prevent the longitudinal separation of said pipes.

7. A protecting device for the cap on the filler pipe of a gasoline tank or the like comprising a flange loosely surrounding said pipe, means for preventing the withdrawal of said flange over the end of said pipe, and removable means in normally locked engagement with said flange for preventing access to said cap.

8. A protecting device for the filling pipe of a gasoline tank or the like comprising an internally recessed flange loosely surrounding said pipe, means for preventing the withdrawal of said flange over the end of said pipe, and covering means for the end of said pipe comprising a divided cylinder having spaced projections about its lower edge adapted to engage the recess in said flange.

9. A protecting device for the filler pipe of a gasoline tank or the like comprising a flange loosely surrounding said pipe, means for supporting said flange in proximity to the end of the pipe, means for sealing said pipe and adapted to coact with said supporting means to prevent separation of the flange and pipe, and removable means in normally locked engagement with said flange for preventing access to the sealing means.

10. In a device of the character described, the combination with a pipe provided with a removable end seal, of a loose pipe surrounding said first pipe and forming a carrying means for a normally locked end covering therefor; said pipes being separable when the inner pipe is unsealed, but otherwise positively locked against separation.

11. In a device of the character described, the combination with a pipe, of a second pipe surrounding said first pipe and forming a carrying means for a normally locked end covering therefor; the outer pipe being loosely disposed about and freely rotatable independent of the inner pipe but longitudinally inseparable therefrom.

12. In a device of the character described, the combination with a pipe, of a second pipe surrounding said first pipe and forming a carrying means for a normally locked end covering therefor; the outer pipe and the covering means being loosely disposed about and freely rotatable independent of the inner pipe and of each other, but longitudinally inseparable from the inner pipe and from each other when locked.

13. As an article of manufacture adapted to be placed over the filling pipe of a gasoline tank or the like which is normally sealed with a removable cap, a flanged pipe adapted to loosely surround said filling pipe, means associated with said flanged pipe and adapted to coact with the cap on said filling pipe to prevent the withdrawal of the flanged pipe from about the filler pipe, removable means in normally locked engagement with said flanged pipe for preventing access to the filler pipe, and a cover coacting with said flanged pipe to protect the whole from the elements.

14. In a device of the character described, the combination with a filling pipe for a tank or the like, of means loosely surrounding said filler pipe including removable means in locked engagement with a portion of said first mentioned means for preventing access to the end of said filler pipe, means for preventing longitudinal separation of said filler pipe and said first mentioned means, and a removable covering means coacting with said first mentioned means for protecting said device from the elements.

15. In a protecting device for the filler pipe of a gasoline tank or the like, the combination with a second pipe loosely disposed around said filler pipe, of removable means associated with said second pipe and normally preventing access to the end thereof, and means on said filler pipe adapted to coact with said second pipe to prevent the withdrawal of the second pipe from about the filler pipe.

ARTHUR SHELDON WELDY.